United States Patent [19]

Hohman et al.

[11] 4,328,016

[45] May 4, 1982

[54] METHOD AND APPARATUS FOR DRYING GLASS BATCH PELLETS

[75] Inventors: Charles M. Hohman, Granville; Mark A. Propster, Gahanna; Stephen Seng, Frazeysburg, all of Ohio

[73] Assignee: Owens-Corning Fiberglas Corporation, Toledo, Ohio

[21] Appl. No.: 216,463

[22] Filed: Dec. 15, 1980

[51] Int. Cl.³ .................. C03B 3/00; C03B 37/025
[52] U.S. Cl. .................................. 65/2; 65/27; 65/134; 65/335
[58] Field of Search ............. 65/27, 134, 335, 2

[56] References Cited

U.S. PATENT DOCUMENTS 4,026,691  5/1977  Lovett et al. .................... 65/27
4,045,197  8/1977  Tsai et al. ...................... 65/27 X
4,074,990  2/1978  Brzozowski et al. ............. 65/27
4,225,332  9/1980  Tsay ........................... 65/335 X

FOREIGN PATENT DOCUMENTS 672598  3/1939  Fed. Rep. of Germany .......... 65/27

Primary Examiner—Robert L. Lindsay, Jr.
Attorney, Agent, or Firm—Ronald C. Hudgens; Patrick P. Pacella; Philip R. Cloutier

[57] ABSTRACT

A process for preheating glass batch pellets is disclosed, the pellets being preheated by tumbling them into a heated gas stream and subsequently by contact of the pellets, in the form of a moving bed, with hot gases from the furnace in which the preheated pellets are melted to form molten glass from which fibers are formed.

12 Claims, 2 Drawing Figures

METHOD AND APPARATUS FOR DRYING GLASS BATCH PELLETS

TECHNICAL FIELD

This invention pertains to a method of drying glass batch pellets.

In one of its more specific aspects, this invention pertains to a method of drying and preheating pellets which are melted to form glass.

BACKGROUND OF THE INVENTION

In the glass producing industry, particulate matter comprising the glass batch is pelletized employing an aqueous solution; the pellets are dried and preheated by contact with hot gases and the hot pellets are introduced into a melter in which they are melted to form molten glass which, in turn, is converted into glass fibers.

Generally, there are two steps involved in bringing the pellets up to the described temperature. The first is a drying step in which the aqueous content of the pellets is expelled by contact with gases at a relatively low temperature. In the second step, the dried pellets are heated to as high a temperature as desired, consistent with the temperature of the hot gases with which they are contacted. In order to best carry out the preheating step, it is desirable that a process be employed which provides for control of the temperature of the hot gases as well as providing some agitation of the pellets, themselves, so that heat transfer between the hot gases and the pellets is maximized by providing intimate contact of the hot gases with a maximum surface of the pellet and insure that pellets remain free flowing.

There has now been developed a process and apparatus which will accomplish this by providing movement of both the pellets and the hot gases while in contact with each other; the contact which results will be greater than that which occurs when the only contact is that which occurs when the pellets move downward as a moving bed in a reactor and into contact with hot gases moving upwardly therethrough.

STATEMENT OF THE INVENTION

According to the present invention, there is provided a process and apparatus for preheating glass batch pellets which comprise introducing pellets into a screw conveyor, tumbling the pellets along the conveyor into a first stream of hot gases, forming the pellets into a bed and moving the bed of pellets into contact with a second hot gas stream, introducing the pellets from the bed into a glass melter, melting the pellets and forming glass fibers therefrom.

In one embodiment of this invention, the first hot gas stream and the second hot gas stream will be of substantially identical composition.

In another embodiment of this invention, some extraneous gas will be introduced into the second gas stream to form the first gas stream.

EXPLANATION OF THE DRAWINGS

The method and apparatus of this invention will be more easily understood if explained in cojunction with the attached drawing of which

Referring now to FIG. 1, there is shown pelletizer 1 into which glass raw batch and a pelletizing agent will be introduced and in which pellets will be formed. The pellets will be introduced through conduit 2 and shut-off valve 3 into screw conveyor 4 in which the screw 20 will be rotated by drive means 5. The screw will be adapted with a curved outer lip and rotated such that the pellets will be conveyed along the conveyor and, simultaneously, will have imparted to them a tumbling action into the after-mentioned hot gases as the pellets move towards the outlet 6 of the conveyor in a partly dried free flowing condition.

Figure 1:
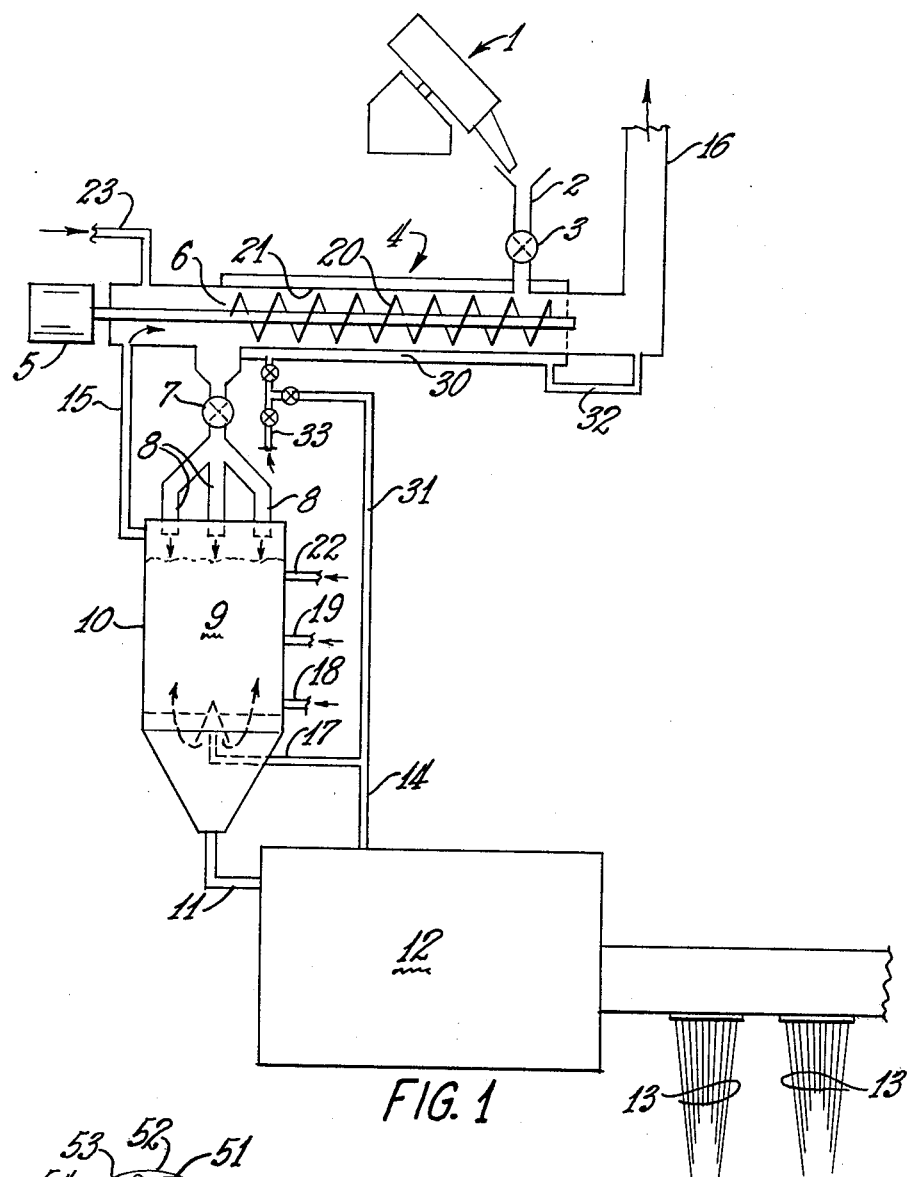
FIG. 1 is a schematic representation of the apparatus of this invention and FIG. 2 is a sketch of a modified screw positioned within the conveyor.

From the outlet of the conveyor, the pellets will pass through valve 7 and conduits 8 onto a downwardly moving bed 9 within hopper 10. The pellets will move downwardly through the hopper and from the hopper through conduit 11 into furnace 12 wherein they will be melted to form liquid glass which will be recovered as glass fibers 13.

Passing through the system in counter-current flow to the pellet flow will be hot gases. Preferably comprised of combustion gases exhausted from the furnace through conduit 14, this second stream of hot gases which is introduced into the contactor at a suitable locus, will rise counter-currently to the downwardly moving pellet bed. The gas stream will pass from the hopper at the top of the bed through conduit 15 and will be introduced therefrom into the screw conveyor as the aforementioned first stream of hot gases.

Figure 2:
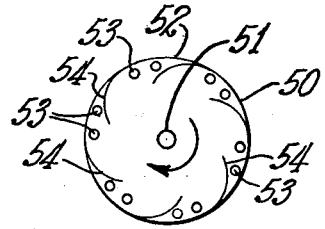

The screw 20 within the conveyor will tumble the pellets along the conveyor rather than merely pushing them along, is shown, in one embodiment in FIG. 2. The screw will be adapted to rotate around axis 51 and will be fitted relatively snugly at its outer perihery 52 against the inner periphery of the conveyor shell. The screw can be of a relatively porous material which will allow the passage of the gas stream therethrough or, preferably, it will be adapted with a plurality of apertures 53, preferably smaller in diameter than the diameter of the pellets, which apertures will permit the passage of gases through the conveyor. These apertures will divide the gas stream into a plurality of streams. The screw will also be adapted with a plurality of vanes 54 which will extend outwardly from the screw and which will possess a slight curvature along their length as well as along their outer edge such that they will act to lift the pellets, and then tumble them through the gas passing through the apertures.

In the emboidment described, the first hot gas stream and the second hot gas stream will be of substantially identical compositions. However, in another embodiment of this invention, any gas, including air, can be introduced into the second gas at any of a plurality of points represented by conduits 17, 18, 19, 22 and 23, with the latter probably of greatest importance.

Certain modifications can be made to the process as described. For example, it is possible to facilitate the pre-heating of the pellets by passing some portion of the hot flue gases in indirect heat exchange with the pellets passing through the conveyor by passing the hot flue gases by means of conduit 31 into jacket 30 of the conveyor 21, the gases passing from the jacket through conduit 32 to disposal by conduit 16. Relatedly, it is possible to limit the pre-heating of the pellets by limiting the temperature of the hot flue gas by introducing air into jacket 30 through conduit 33.

It will be evident from the foregoing that various modifications can be made to the method and apparatus of this invention. Such, however, are considered within the scope of the invention.

We claim:

1. A process for producing fibers from glass batch pellets which comprises:
   a. tumbling said pellets into contact with a first hot gas stream to heat said pellets;
   b. introducing said pellets onto a bed of pellets;
   c. moving said bed of pellets into contact with a second hot gas stream to further heat said pellets;
   d. removing said second hot gas stream from contact with said bed and forming said first hot gas stream comprising said second gas stream;
   e. melting the further heated pellets to form molten glass; and,
   f. forming fibers from said molten glass.

2. The process of claim 1 in which said bed of pellets is moved downwardly into contact with the upwardly rising second gas stream.

3. The process of claim 1 in which said pellets are tumbled into contact with a plurality of gas streams.

4. The process of claim 1 in which said first hot gas stream and said second hot gas stream are of substantially identical composition.

5. The process of claim 1 in which the pellets in step (a) are heated by indirect heat exchange.

6. The process of claim 1 in which a gas is introduced into said second hot gas stream to form said first hot gas stream.

7. The process of claim 1 in which air is introduced into said second gas stream at a plurality of loci.

8. Apparatus comprising:
   a. a pelletizer;
   b. a screw conveyor in open relationship with said pelletizer;
   c. a contactor adapted to receive pellets from said conveyor and hot flue gases;
   d. a furnace adapted to receive pellets from said contactor and to melt said pellets to form molten glass; and,
   e. means for forming glass fibers from said molten glass.

9. The process of claim 1 in which said first hot gas stream is contacted with said tumbling pellets as a plurality of streams.

10. The process of claim 9 in which the diameter of said plurality of streams is less than the diameter of said pellets.

11. The apparatus of claim 8 in which said screw conveyor comprises screws comprising a porous material allowing the passage of gas therethrough.

12. The apparatus of claim 8 in which said screw conveyor comprises screws having a plurality of apertures therein.

* * * * *